United States Patent [19]

Mandelcorn

[11] Patent Number: 4,616,302
[45] Date of Patent: Oct. 7, 1986

[54] OVER-CURRENT SENSING CIRCUIT FOR SWITCHING-TYPE POWER SUPPLY

[75] Inventor: Josh Mandelcorn, Los Angeles, Calif.

[73] Assignee: Pioneer Magnetics, Inc., Santa Monica, Calif.

[21] Appl. No.: 738,287

[22] Filed: May 28, 1985

[51] Int. Cl.⁴ .......................... H02H 7/10; G05F 1/46
[52] U.S. Cl. ...................... 363/50; 323/285; 323/276; 323/909; 361/18; 361/79
[58] Field of Search ............... 323/275, 276, 277, 285, 323/909; 363/50, 52–53; 361/79, 87, 93, 18

[56] References Cited

U.S. PATENT DOCUMENTS

| | | | |
|---|---|---|---|
| 3,532,936 | 10/1970 | Kuster | 323/909 X |
| 3,801,894 | 4/1974 | Spiegel | 323/276 |
| 4,309,653 | 1/1982 | Stack et al. | 323/909 X |
| 4,346,342 | 8/1982 | Carollo | 323/276 |
| 4,485,342 | 11/1984 | Hill et al. | 323/909 X |

*Primary Examiner*—Peter S. Wong
*Attorney, Agent, or Firm*—Keith D. Beecher

[57] ABSTRACT

An over-current sensing circuit for use with a switching-type power supply for achieving fold-back, which senses not only the load current drawn from the power supply, but also the voltage at the load and the voltage across the power supply potentiometer which is used to set the output voltage. The sensing circuit thereby serves to maintain the current limit point at which fold-back occurs virtually constant in the presence of adjustments of the output voltage of the power supply and regardless of the resistance of the bus which connects the power supply to the load.

3 Claims, 3 Drawing Figures

OVER-CURRENT SENSING CIRCUIT FOR SWITCHING-TYPE POWER SUPPLY

BACKGROUND OF THE INVENTION

Most present-day switching-type power supplies include a sensing circuit for providing fold-back current limiting to the power supply in order to prevent the power supply from self-destructing in the event that a current or voltage overload occurs. One such current fold-back circuit is described, for example, in U.S. Pat. No. 4,128,866.

The prior art current fold-back circuits, however, for the most part, sense only the local output current of the power supply. This means that the current sensing level must be adjusted every time the output voltage of the power supply is adjusted. If such an adjustment is not made to the current sensing level in the prior art sensing circuits, the limit current at which current fold-back occurs rises when the output voltage is increased and drops when the output voltage is decreased.

The current fold-back circuit of the present invention corrects the problem by sensing the voltage across the power supply potentiometer which is used to adjust output voltage, and accordingly the circuit of the invention serves to maintain the current limiting point virtually constant as the output voltage is adjusted.

When the power supply is connected to a remote load through a bus, the remote current sense point increases depending upon the resistance of the bus. This can create a situation in that short circuits in the load are undetected. The circuit of the present invention also senses the voltage across the remote load so as to maintain the current limiting point essentially constant regardless of bus-to-load resistance.

BRIEF DESCRIPTION OF THE DRAWINGS

FIG. 3 is a curve showing the current fold-back characteristics of the circuit of the invention.

DETAILED DESCRIPTION OF THE ILLUSTRATED EMBODIMENT

Figure 1:
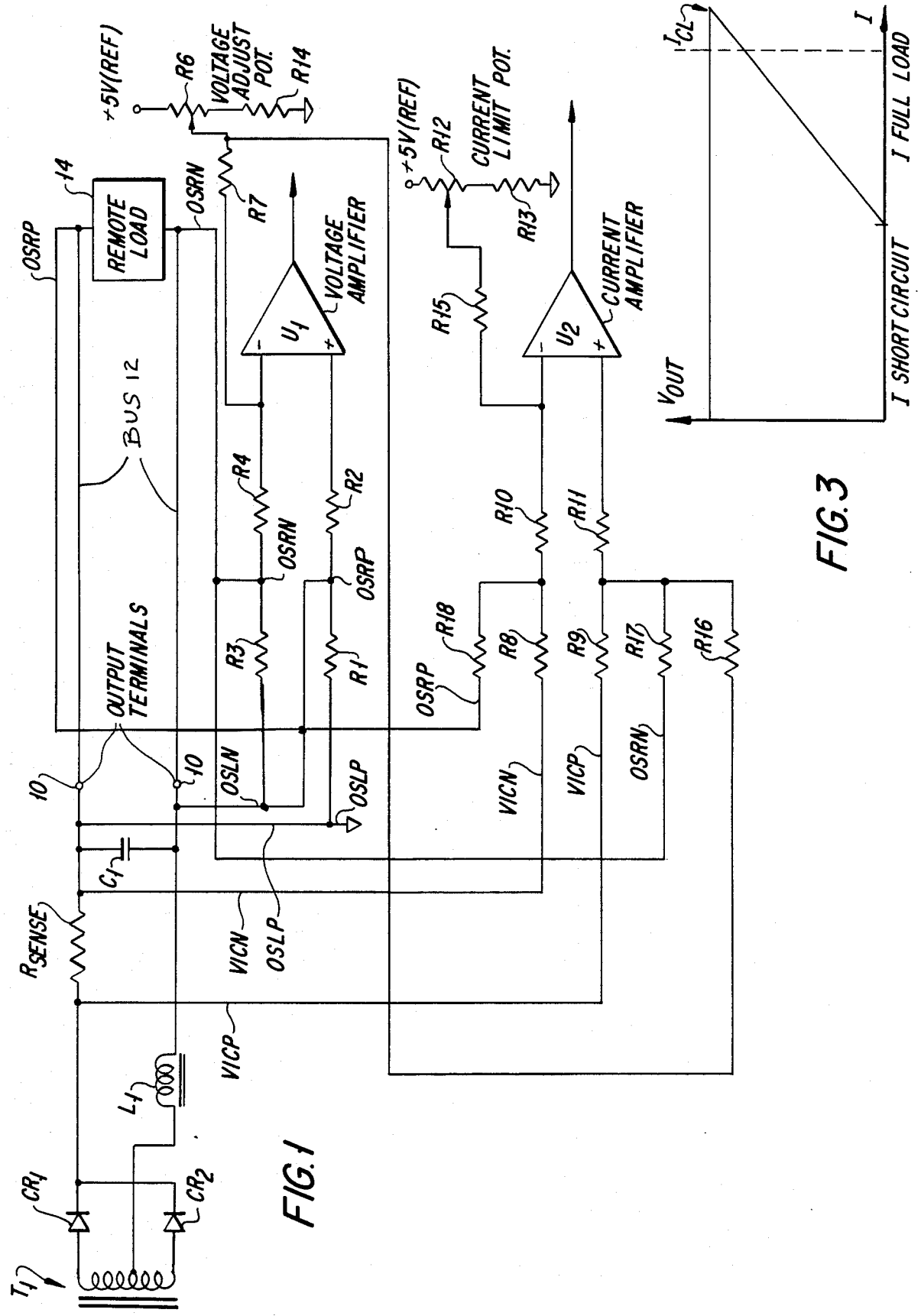
FIG. 1 is a schematic circuit diagram of the sensing circuit of the invention, and showing the manner in which the sensing circuit is connected to the output of a switching type power supply.

The schematic circuit diagram of FIG. 1 includes the output circuit of a typical switching type power supply, which is connected to the secondary winding of the power transformer T1 of the power supply. The output circuit includes the usual diodes CR1 and CR2 connected to the secondary winding, and through a choke coil L1 and a sense resistor $R_{SENSE}$ to a filter capacitor C1 which is connected across the output terminals 10 of the power supply. The output terminals are connected through a bus 12 to a remote load 14.

A current limiting circuit for providing fold-back current to the power supply is connected across the resistor $R_{SENSE}$. The current limiting circuit includes a a current amplifier U2. A voltage regulating circuit including a voltage error amplifier U1 is also provided. The output terminals 10 are connected to the (+) input of amplifier U1 by way of leads designated OSLP (local voltage sense positive) and OSLN (local voltage sense negative) by way of resistors R1 and R3. The two sides of the remote load 14 are connected through respective leads OSRP (remote voltage sense positive) and OSRN (remote voltage sense negative) to the (−) input of voltage amplifier U1 by way of resistors R2 and R4.

A voltage adjust potentiometer R6 is included in the voltage regulator circuit, and the potentiometer is connected between a 5-volt positive reference source and a grounded resistor R14. This potentiometer controls the reference voltage for the voltage regulator and hence establishes an adjustable output voltage for the power supply. The wiper of the potentiometer is connected to the (−) input of amplifier U1 through a resistor R7. Amplifier U1 provides a regulating output voltage for the power supply in response to voltage differentials at either the output terminals or at the remote load to maintain the output voltage of the power supply at a regulated level established by the voltage adjust potentiometer R6. When the remote sense (OSRN, OSRP) is connected, the remote sense controls the input to the voltage amplifier, when the remote sense (OSLN, OSLP) is disconnected the local sense takes over and controls the input to the voltage error amplifier, in this example.

The two sides of the resistor $R_{SENSE}$ are connected by leads designated VICN (current sense negative) and VICP (current sense positive) to resistors R8 and R9 respectively. These resistors are connected through respective resistors R10 and R11 to the (−) and (+) inputs of current amplifier U2. A current limit potentiometer R12 is connected between the positive 5-volt reference source and a grounded resistor R13. The wiper of the potentiometer R12 is connected through a resistor R15 to the (−) input of amplifier U2.

The wiper of the voltage adjust potentiometer R6 is also connected through a resistor R16 to the junction of resistors R9 and R11, and the lead OSRN is connected through a resistor R17 to the same junction, whereas the lead OSRP is connected through a resistor R18 to the junction of resistors R8 and R10.

The current amplifier U2 provides an output whenever the current through resistor $R_{SENSE}$ exceeds a certain limit, as established by potentiometer R12; this limit is reduced as the output voltage at load 14 falls below the set voltage. This is what is called foldback. The balance of inputs to the current amplifier U2 is maintained essentially constant when the voltage-adjust potentiometer R6 is adjusted, so that the current limit point is rendered independent of adjustments of the potentiometer R6.

The outputs of the amplifiers U1 and U2 are used to control the power supply to provide voltage regulation and fold-back current protection in the event of excessive currents or voltages.

The circuit of FIG. 1 acts to sense the voltage across the voltage adjust potentiometer R6 in order to maintain the current limiting point virtually constant as the output voltage is adjusted; and it also senses the voltage across the remote load to maintain the current limiting point essentially constant regardless of bus-to-load resistance.

The current amplifier produces an output when the current exceeds a threshold so that VICP applied to the (+) input of the current amplifier exceeds the voltage at the (−) input which is determined by the setting on the current potentiometer. When the voltage between OSRP and OSRN is reduced, less power supply current and a lower voltage at VICP is needed for the voltage at the (+) input to equal or exceed the voltage at the (−) input to the current amplifier U2, so that the current limit is less at lower output voltages resulting in a current fold-back, such as shown by the curve of FIG. 3, as the current amplifier attempts to maintain a null voltage condition between the (+) and (−) inputs. When the current overload condition is removed, the power supply will return to its normal operation since the voltage impressed on the (+) input of amplifier U2 is no longer greater than the voltage established on the (−) input by the potentiometer R12.

Figure 2:
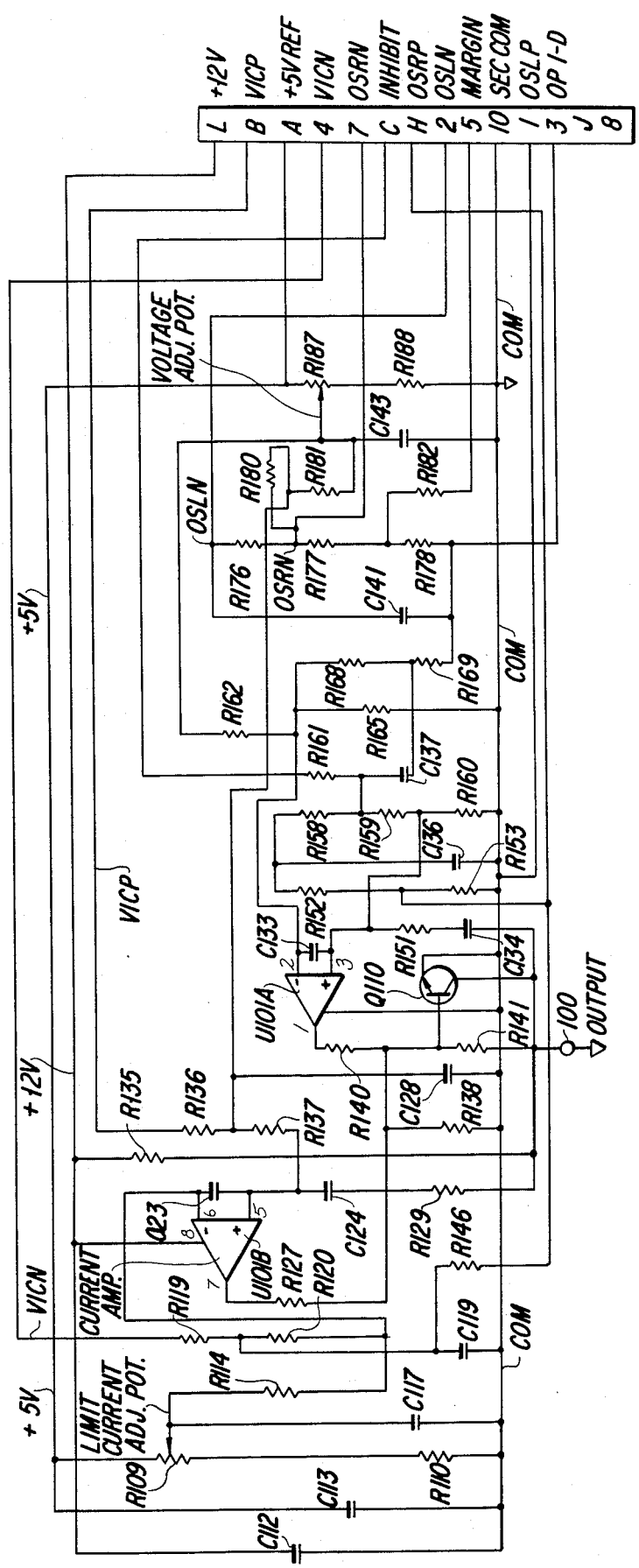
FIG. 2 is a more detailed circuit diagram of a sensing circuit representing one embodiment of the invention.

In the circuit of FIG. 2, an operational amplifier U101A is utilized as the voltage error amplifier, and an operational amplifier U101B is utilized as the current amplifier. These amplifiers may be part of an integrated circuit of the type designated LM358. The voltages VICP, VICN, OSRP, OSRN, OSLP and OSLN are introduced to the circuit of FIG. 2 by way of a terminal strip J118, and other voltages are also introduced to the circuit through the terminal strip.

The voltage adjust potentiometer is designated R187, and it has a resistance of 1 kilo-ohm. It is connected to the +5-volt reference lead, and through a 1.2 kilo-ohm resistor R188 to a common lead COM which represents chassis ground. The OSLP lead, as shown, is connected to the common lead. The wiper of the voltage adjust potentiometer 187 is connected through resistor R162 to the (−) input of amplifier U101A, and through a resistor R165 to the common lead COM.

The OSLN and OSRN terms are applied to the opposite ends of a 100 ohm resistor R176 which is connected through resistors R177, R178, R169 and R168 to the (−) input of amplifier U101A. Resistors R176, R177 and R178 are shunted by a capacitor C141. The OSRN term is also applied to a resistor R180 which is connected through a resistor R181 to the wiper of the voltage adjust potentiometer 187. The wiper is also connected to a 0.1 microfarad capacitor C143 which is connected to the common lead COM. The OSRP term is applied to the junction of a resistor R152 and a 100 ohm resistor R153. The latter resistor is connected to OSLP term and the common lead COM. Resistor R152 is also connected to the common lead through resistors R158, R159 and R160. The junction of resistors R159 and R160 is connected to the (+) input of the voltage error amplifier. A capacitor C136 is connected across resistors R152 and R153.

The output of amplifier U101A is connected through resistor R140 and base of transistor Q110 with a feedback 6.8 kilo-ohm R141 to the output terminal 100 of the circuit which provides the regulating voltage for the power supply. The (+) input of amplifier U101A is also connected to a resistor R151 which is connected to the output terminal 100 through a capacitor C134 to provide a feedback path for the amplifier. An NPN transistor Q110, which may be of the type designated 2N2222A is connected in circuit with the voltage error amplifier U101A, as shown, and serves as an inverting amplifier. A 100 picofarad capacitor C113 is connected across the two input terminals of the amplifier U101A. All capacitors shown in the circuit of FIG. 2 serve to provide frequency compensation of control loops and/or high frequency noise suppression.

The VICP term is introduced to the (+) input of current amplifier U101B through 91 ohm resistor R136 and through a resistor R137. The (+) terminal is connected to a capacitor C124 which is connected through a resistor R129 to the output terminal 100 to provide frequency compensated feedback for the current amplifier. The output of amplifier U101B is connected through a resistor R127 to the base of transistor Q110 where it is "or'd" with the output of the voltage amplifier U101A through resistor R140. Thereby the outputs of the current amplifier and voltage error amplifier are effectively "or'd" to control the power supply. A 330 picofarad capacitor C123 is connected across the (+) and (−) inputs of amplifier U101B. The resistors R127 and R140 are connected to the common lead COM through a 2.2 kilo-ohm resistor R138. The junction of resistors R136 and R137 is connected to a 0.33 microfarad capacitor C128 which, in turn, is connected to the common lead COM.

The term VICN is introduced to the (−) input of the current amplifier U101B through a 91 ohm resistor R119 and through a resistor R120. The term OSRP is introduced to the junction of resistors R119 and R120 through a resistor R146. The junction of resistors R119 and R120 is connected to a 0.33 microfarad capacitor C119 which, in turn, is connected to the common lead COM. This capacitor C119 along with capacitor C128 mentioned above serve to reject high frequency noise from the current shunt.

The limit current adjust potentiometer R109 has a resistance of 5 kilo-ohms, and is connected, together with a 6.2 kilo-ohm series resistor to the +5-volt reference line and to the common line COM. The potentiometer R109 and resistor R110 are shunted by a 0.33 microfarad capacitor C113. A 3.3 kilo-ohm resistor R135 is connected between the +12-volt lead and the output terminal 100. A 0.33 microfarad capacitor C112 is connected between the +12-volt lead and the common lead COM. A 0.1 microfarad capacitor C117 is connected to the wiper of the current limit adjust potentiometer R109 and the common lead COM. The wiper of the current adjust potentiometer is connected through a resistor R114 to the (−) input of current amplifier U101B.

The following resistors and capacitors have the following values:

R114—150K
R120—910
R127—510
R129—33,000
R137—910
R140—2200
R146—39,000
R151—15,000
R152—6810
R158—2210
R159—1210
R160—3240
R161—4300
R162—8060
R165—5360
R168—1210
R169—2210
R177—5360
R178—1430
R180—39,000
R181—30,000
R182—51,100
C119—0.33 uF
C124—6800 pF
C134—47,000 pF
C136—47,000 pF
C137—22,000 pF
C141—47,000 pF

These values are for 5 V 300 amp, and they will vary for other output voltages and currents.

The circuit of FIG. 2 operates in the same manner as the schematic circuit of FIG. 1, as described above. The circuit is such that any adjustments of the voltage adjust potentiometer R187 to set the output voltage does not affect the current limit point previously set by the limit current adjust potentiometer R109. Also, the current limit point is maintained virtually constant regardless of the bus-to-load resistance.

The fold-back concept of the invention may be also used where current sense is achieved from a transformer through a diode bridge; or where the regulator ground reference is not tied to the local output sense. The concept may also be used in a lienar power supply.

It will be appreciated that while particular embodiments of the invention have been shown and described, modifications may be made. It is intended in the claims to cover all modifications which come within the spirit and scope of the invention.

I claim:

1. A current limiting voltage regulating circuit for a direct current power supply including: a voltage regulator circuit including a potentiometer having a wiper adjustable to set the regulated output voltage appearing across the output terminals of the power supply to a selected level; current sensing means coupled to the power supply for producing a voltage proportional to the load current flowing in the power supply; a current limiting circuit including an amplifier for generating an output signal when the current flow in the power supply exceeds a pre-set current limit point; a current limit circuit connected to said amplifier for establishing said pre-set current limit point; and a network connected to the current sensing means and to the wiper of the potentiometer for applying input signals to the amplifier of an amplitude to reduce the output signal of the amplifier to zero during normal operation of the power supply below said pre-set current limit point and independent of the setting of said potentiometer, and to cause the amplifier to generate an output signal during current overload conditions of the power supply above the current limit point so as to reduce the output voltage thereof with resulting current feedback.

2. The system defined in claim 1, in which the power supply is connected to a remote load over a bus, and in which said network is also connected across the load to sense the voltage appearing across the load so as to cause the current limit point to be independent of the resistance of the bus.

3. The system defined in claim 1, and which includes a current limit potentiometer included in said current limit circuit to establish said current limit point.

* * * * *